(No Model.)

W. A. MADDY.
THILL COUPLING.

No. 453,428. Patented June 2, 1891.

Witnesses:
C. H. Raeder
H. F. Matthews

Inventor
William A. Maddy
By James Sheehy
Attorney

UNITED STATES PATENT OFFICE.

WILLIAM A. MADDY, OF POMEROY, OHIO.

THILL-COUPLING.

SPECIFICATION forming part of Letters Patent No. 453,428, dated June 2, 1891.

Application filed January 21, 1891. Serial No. 378,619. (No model.)

*To all whom it may concern:*

Be it known that I, WILLIAM A. MADDY, a citizen of the United States, residing at Pomeroy, in the county of Meigs and State of Ohio, have invented certain new and useful Improvements in Thill-Couplings; and I do declare the following to be a full, clear, and exact description of the invention, such as will enable others skilled in the art to which it appertains to make and use the same.

My invention relates to improvements in thill-couplings; and its novelty will be fully understood from the following description and claims, when taken in connection with the accompanying drawings, in which—

Figure 1:
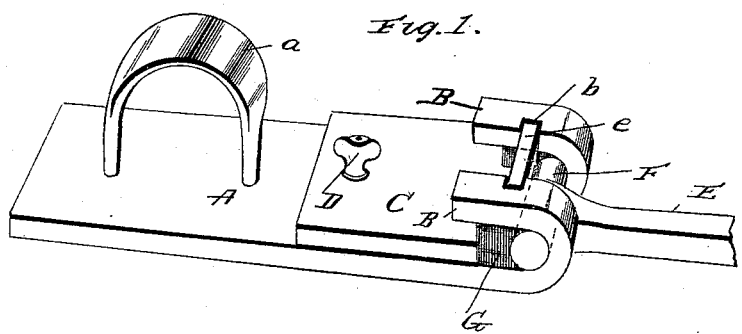
Figure 2:
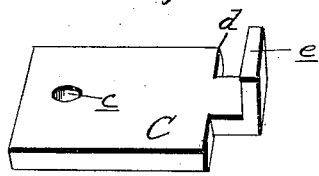
Figure 3:
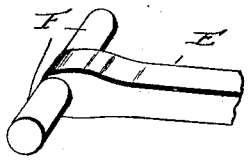

Figure 1 is a perspective view of my improvements complete. Fig. 2 is a perspective view of the angular locking-plate, and Fig. 3 is a detail perspective view of the thill-connecting section.

In the said drawings similar letters designate corresponding parts throughout the several views, referring to which—

A indicates the main or base plate of my improved coupling, which may be attached to the axle of a vehicle by a clip, as $a$, or in any other approved manner. This base-plate A is longitudinally slotted for a portion of its forward length, and the branches B so formed are bent upwardly and rearwardly, as illustrated in Fig. 1, to afford a seat for the thill-connecting section presently to be described, and the said branches B are also provided in the inside of their horizontal portions with vertically-disposed rectangular recesses $b$, designed to seat and retain the vertical angular branch of the locking-plate C, which is provided at a suitable point with a vertical aperture $c$ to receive a winged connecting-screw D, which takes through a vertical screw-threaded aperture at a suitable point in the plate A, whereby the locking-plate is positively connected to the main plate.

The forward portion of the locking-plate C is reduced in width, so as to form shoulders $d$, designed and adapted to bind a rubber block against the thill-connecting section, as will be presently described. This reduced portion of the plate B is provided with an angular upright branch $e$, which in operation is seated in the vertical recesses $b$ of the main plate, whereby a strong and secure attachment is effected between the forward portions of the main and locking-plate, and any danger of the locking-plate being casually displaced is effectually obviated.

By the provision of the angular branch of the locking-plate keyed to the branches B of the plate A, as described, it will further be seen that a positive and secure means is afforded for locking the T branch of the thill-section and the rubber block in the branch of the main plate.

E indicates the thill-section, which may be attached to the thill or to one of the branches of a vehicle-pole in the ordinary or any approved manner. This thill-section E is provided at its end with a T branch F, which is circular in cross-section and is designed to be seated in the curved portion of the branches B and be fixed therein by the angular locking-plate before described.

G indicates the rubber block, which is interposed between the locking-plate and the T branch of the thill-section to obviate the objectionable rattling so often experienced. This block G is reduced in its middle and has its forward vertical side concaved, as shown, to conform to the round T branch of the thill-section.

It is obvious that instead of employing one block G, reduced in its middle, two blocks might be employed; but I prefer to employ but one block, as a casual displacement thereof is less likely to occur.

In effecting the connection between the thill-section and the main plate or section it is simply necessary to place the T branch of the thill-section in the position shown in Fig. 1, when the rubber block is placed as shown, and the angular locking-plate is tilted and its angular branch inserted in the recesses of the branches B from the lower side thereof. The screw D then completes the attachment of the locking-plate, and a safe and durable coupling is afforded.

Having described my invention, what I claim, and desire to secure by Letters Patent, is—

1. In a thill-coupling, the combination, with the main plate longitudinally slotted in its forward portion and having the upwardly and rearwardly curved branches provided in the inside of their horizontal portions with aligned vertical recesses, of the thill-section having a T branch adapted to be seated in the curved branches of the main plate, the locking-plate adapted to be connected to the main plate and having the reduced forward portion and the angular branch adapted to be seated in the recesses of the curved branches of the main plate, and the interposed rubber block between the locking-plate and the T branch of the thill-section, substantially as specified.

2. In a thill-coupling, the combination, with a main plate longitudinally slotted in its forward portion and having the upwardly and rearwardly curved branches provided in the inside of their horizontal portions with aligned vertical recesses, of the thill-section having a T branch adapted to be seated in the curved branches of the main plate, and the locking-plate having the forward reduced portion and the angular branch adapted to be seated in the recesses of the curved branches of the main plate, substantially as and for the purpose described.

In testimony whereof I affix my signature in presence of two witnesses.

W. A. MADDY.

Witnesses:
W. H. PROBST,
G. L. PROBST.